(12) United States Patent
Hunter et al.

(10) Patent No.: US 11,104,214 B2
(45) Date of Patent: Aug. 31, 2021

(54) HINGED FLEXIBLE CABLE COUPLER AND ROLL TARP SYSTEM

(71) Applicant: Roll-Rite LLC, Gladwin, MI (US)

(72) Inventors: Stephen Hunter, Midland, MI (US); Douglas Piccard, Ypsilanti, MI (US); Robert Malcolm, Waterford, MI (US); James Pinon, Troy, MI (US)

(73) Assignee: Roll Rite LLC, Gladwin, MI (US)

( * ) Notice: Subject to any disclaimer, the term of this patent is extended or adjusted under 35 U.S.C. 154(b) by 85 days.

(21) Appl. No.: 16/480,326

(22) PCT Filed: Jan. 25, 2018

(86) PCT No.: PCT/US2018/015179
§ 371 (c)(1),
(2) Date: Jul. 24, 2019

(87) PCT Pub. No.: WO2018/140572
PCT Pub. Date: Aug. 2, 2018

(65) Prior Publication Data
US 2019/0389288 A1    Dec. 26, 2019

Related U.S. Application Data

(60) Provisional application No. 62/450,472, filed on Jan. 25, 2017.

(51) Int. Cl.
*B60J 7/08*    (2006.01)
(52) U.S. Cl.
CPC .................... *B60J 7/085* (2013.01)
(58) Field of Classification Search
CPC ..................................... B60J 7/085
USPC ............................................ 296/98
See application file for complete search history.

(56) References Cited

U.S. PATENT DOCUMENTS

| 3,311,333 | A | 3/1967 | Galloway |
| 7,188,887 | B1* | 3/2007 | Schmeichel ............. B60J 7/085 |
| | | | 296/100.14 |
| 7,195,304 | B1 | 3/2007 | Schmeichel |
| 7,866,725 | B1 | 1/2011 | Searfoss et al. |
| 8,910,996 | B2* | 12/2014 | Bremer ..................... B60J 7/085 |
| | | | 296/98 |
| 8,998,287 | B2* | 4/2015 | Smith ...................... B60J 7/085 |
| | | | 296/98 |
| 9,415,667 | B2 | 8/2016 | Smith et al. |
| 9,637,040 | B1* | 5/2017 | Berg ........................ B60J 7/085 |

(Continued)

FOREIGN PATENT DOCUMENTS

EP        2266826        12/2010

*Primary Examiner* — Jason S Morrow
(74) *Attorney, Agent, or Firm* — Miller Canfield

(57) ABSTRACT

A roll tarp system for a truck or trailer having a container with a rear door. The roll tarp system includes a roll tarp mounted to an axle assembly and a cable coupler assembly coupled to the axle assembly. A flexible cable connects the cable coupler assembly to a rear arm which is pivotally attached to the rear door. The cable coupler assembly includes first and second hinge members and is rotatably coupled to the axle assembly to permit unrolling and rolling up of the tarp and to permit opening of the rear door in a sideways or upward direction. The cable coupler assembly may include one or more apertures to permit access to a manual drive shaft which passes through the cable coupler assembly.

12 Claims, 5 Drawing Sheets

(56) References Cited

U.S. PATENT DOCUMENTS

| | | | |
|---|---|---|---|
| 9,669,752 B2* | 6/2017 | Bielfelt | B60J 7/12 |
| 10,071,619 B2* | 9/2018 | Smith | B60J 7/085 |
| 10,155,435 B2* | 12/2018 | Searfoss | B60J 7/085 |
| 2013/0241230 A1 | 9/2013 | Knight et al. | |
| 2013/0249236 A1* | 9/2013 | Smith | B60J 7/085 |
| | | | 296/98 |
| 2014/0203589 A1 | 7/2014 | Bremer | |
| 2019/0111769 A1* | 4/2019 | Bremer | B60P 7/04 |

* cited by examiner

HINGED FLEXIBLE CABLE COUPLER AND ROLL TARP SYSTEM

CROSS-REFERENCE TO RELATED APPLICATIONS

This application claims priority to U.S. provisional patent application No. 62/450,472, filed Jan. 25, 2017.

FIELD

The present disclosure relates to a roll tarp system for vehicles and trailers including containers with rear opening doors. More specifically, a flexible cable coupler and hinge are described which assist in the deployment of the roll tarp system over the container while also allowing pivotal movement of the rear opening doors.

BACKGROUND

Vehicles such as trucks and tractors may transport trailers or container boxes having open tops which are protected with a tarp. Roll tarp systems are used to cover such vehicles and typically include a spool, roller or axle assembly attached to one side of the container. The axle assembly is used to unroll or open the tarp and cover the container, and also roll up the tarp to uncover the container. A rear door may need to be opened to permit the contents of the trailer or container to be removed.

SUMMARY

According to one embodiment, there is provided a roll tarp system for a truck or trailer having a container with a rear door. The roll tarp system includes an axle assembly; a roll tarp mounted on the axle assembly, attached to one side of the container, and adapted to cover the contents of the container; a rear arm pivotally attached to the rear door; a cable coupler assembly rotatably coupled to the axle assembly and having first and second hinge members; and a flexible cable with a first end attached to the rear arm and a second end attached to the second hinge member of the cable coupler assembly.

In one embodiment, the first hinge member is a hinge inner plate rotatably coupled to the axle assembly and the second hinge member is a hinge outer plate pivotally coupled to the hinge inner plate. The hinge inner and outer plates may be pivotally coupled in a barrel hinge arrangement, flush hinge, pivot hinge, or spring hinge arrangement.

In one embodiment, the first and second hinge plates define first and second apertures. A manual drive shaft is coupled to the axle assembly and extends through first and second apertures.

In one embodiment, the first and second hinge members of the cable coupler assembly are connected by a hinge pin. The hinge pin may be oriented vertically for a side-opening rear door or horizontally for an upward opening rear door.

In another embodiment, of the roll tarp system, the first hinge member is a first hinge plate rotatably coupled to the axle assembly and the second hinge member is a cable cap pivotally coupled to the first hinge plate. The first hinge plate may define a first aperture permitting a manual drive shaft to be coupled to the axle assembly and extend through first aperture. The cable cap is pivotally coupled to the first hinge plate through a hinge pin. The cable cap may be connected to either end of the hinge pin. Again, the hinge pin may be oriented vertically for a side-opening rear door, or oriented horizontally for an upward opening rear door.

In one embodiment, the cable coupler assembly further includes a hinge shaft, the first hinge member being mounted to the hinge shaft, a hinge shaft housing coupled to the axle assembly, and at least two bearings rotatably coupling the hinge shaft and the hinge shaft housing.

The cable coupler assembly may include a manual drive hub mounted within the axle assembly. The manual drive shaft extends through the hinge shaft and is also coupled to the manual drive hub.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

FIGS. 1-5 illustrate a roll tarp system and a cable coupler assembly according to one embodiment of the present disclosure. Specifically, referring to FIGS. 1 and 2, a roll tarp system for selectively covering and uncovering a container of a truck is generally shown at 10. The container of the truck is illustrated at 12 including spaced apart and opposite side walls 14, 16 extending between a front wall (not shown) and a rear wall defined by a rear door 20. The rear door 20 is generally pivotally coupled to one of the side walls 14, 16 to rotate approximately 270 degrees from a fully closed position perpendicular to and extending between the side walls 14, 16 to a fully opened and stowed position parallel to the side wall 14, 16. Alternatively, the rear door 20 may also be pivotally coupled to the top corners between the side walls 14, 16 to rotate vertically upward approximately 90 to 120 degrees from a fully closed position to a fully opened position spaced above the side walls 14, 16. Dual action hinges (not shown) may enable the rear door 20 to open either to the side or vertically upwards.

Figure 1:
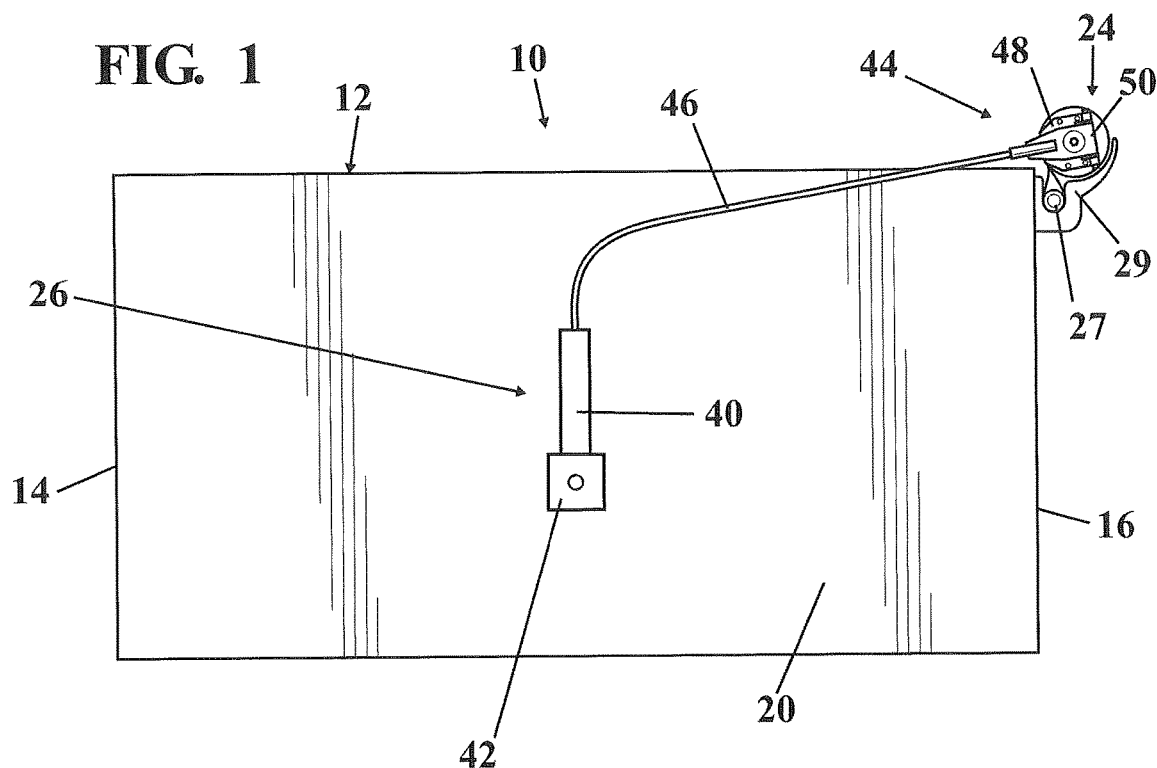
FIG. 1 is an end view of a container box and a cable coupler assembly according to one embodiment of the present disclosure with a roll tarp in an open position.
Figure 2:
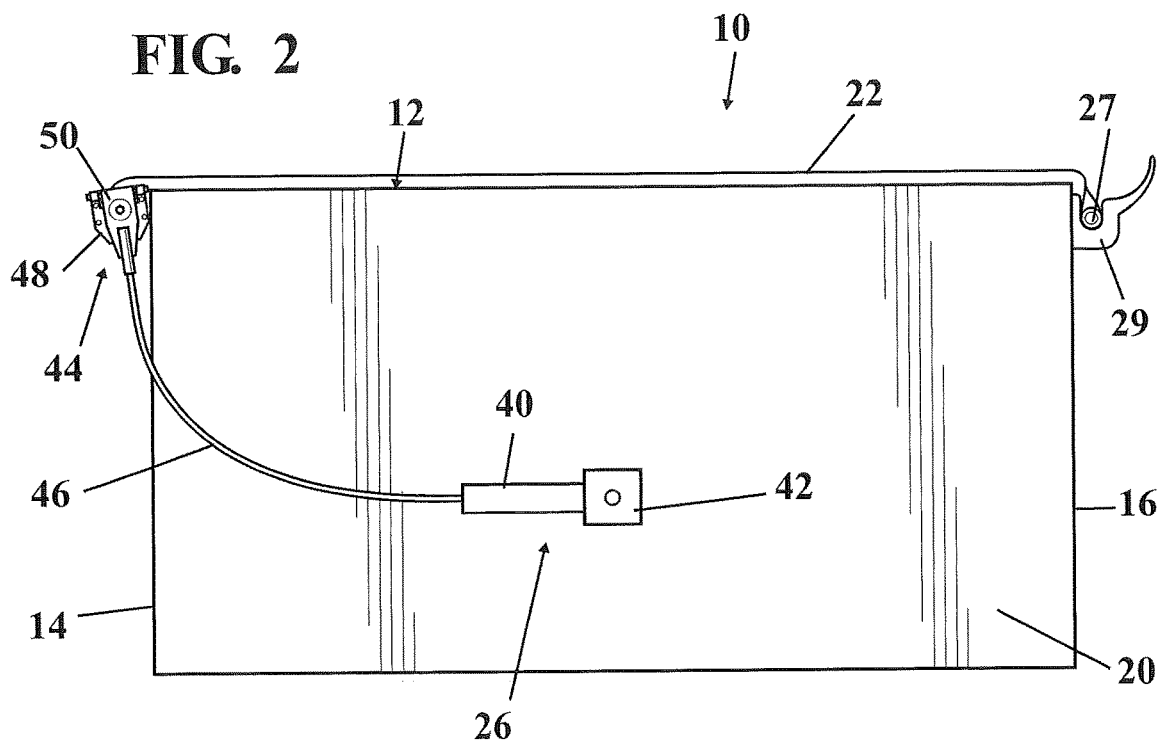
FIG. 2 is an end view of the container box and cable coupler assembly of FIG. 1 with the roll tarp in a closed position.

The roll tarp system 10 includes a flexible cover or tarp 22, a winding assembly 24 for supporting, winding and extending the tarp 22 over the container 12, and a pair of arms 26 pivotally coupled to the front wall and rear door 20 of the container for mounting, guiding and rotatably supporting the winding assembly 24 and tarp 22 on and between the sides 14, 16 of the container between an open position allowing access to the open top of the container 12 as shown in FIG. 1 and a closed position covering the top of the container 12 as shown in FIG. 2.

The winding assembly 24 includes a tarp spool or axle assembly 30 operatively coupled and rotatably supported between the spaced apart pair of arms 26. The axle assembly 30 is generally cylindrical and hollow and supports the tarp 22 for winding and unwinding the tarp 22 thereby selectively covering and uncovering the container 12 in the open and closed positions. As is known for roll tarp systems, one end 27 of the tarp 22 may be secured to side wall 14 of the container 12 through a bracket 29 and the rolled up tarp 22 and axle assembly 30 may be supported along the side wall 14 by additional brackets (not shown). A motor and gear box assembly (not shown) is supported within the axle assembly 30 for rotatably coupling the axle assembly 30 at each end to the arms 26. That is, the motor and gear box assembly is mounted internally within the hollow of the axle assembly 30 and concealed from the tarp 22 and external elements. In some embodiments, the motor and gear box assembly is provided at one end of the axle assembly 30 adjacent the front wall of the container.

Referring to FIGS. 1-4, one of the arms 26 is pivotally coupled to the rear door 20. More specifically, the arm 26 includes an elongated rigid arm portion 40 extending longitudinally between a proximal end pivotally coupled to the rear door 20 at pivot 42 and an opposite distal end. A flexible cable coupler assembly 44 according to one embodiment of the present disclosure pivotally supports the end of the axle assembly 30 in each of the open and closed positions. A flexible cable 46 has a first end fixedly secured to the distal end of the arm portion 40 and a second end fixedly secured to the cable coupler assembly 44. The flexible cable 46 extends between the arm 26 and the cable coupler assembly 44 to allow free pivotal movement of the arm portion 40 and cable coupler assembly 44 during winding and unwinding of the tarp 22 between the open and closed positions.

Figure 3:
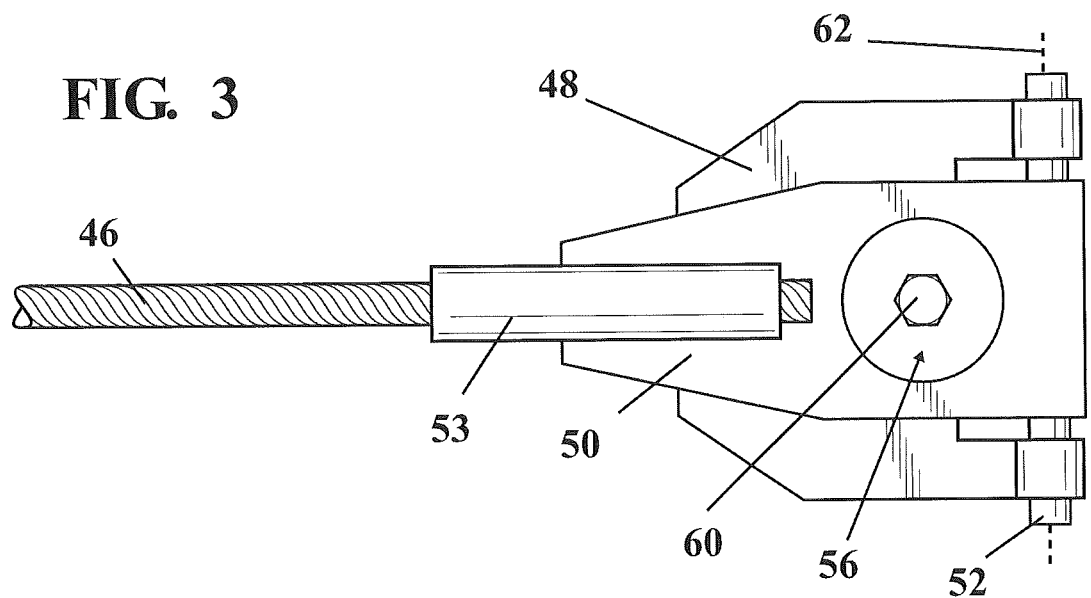
FIG. 3 is a close-up end view of the cable coupler assembly.
Figure 4:
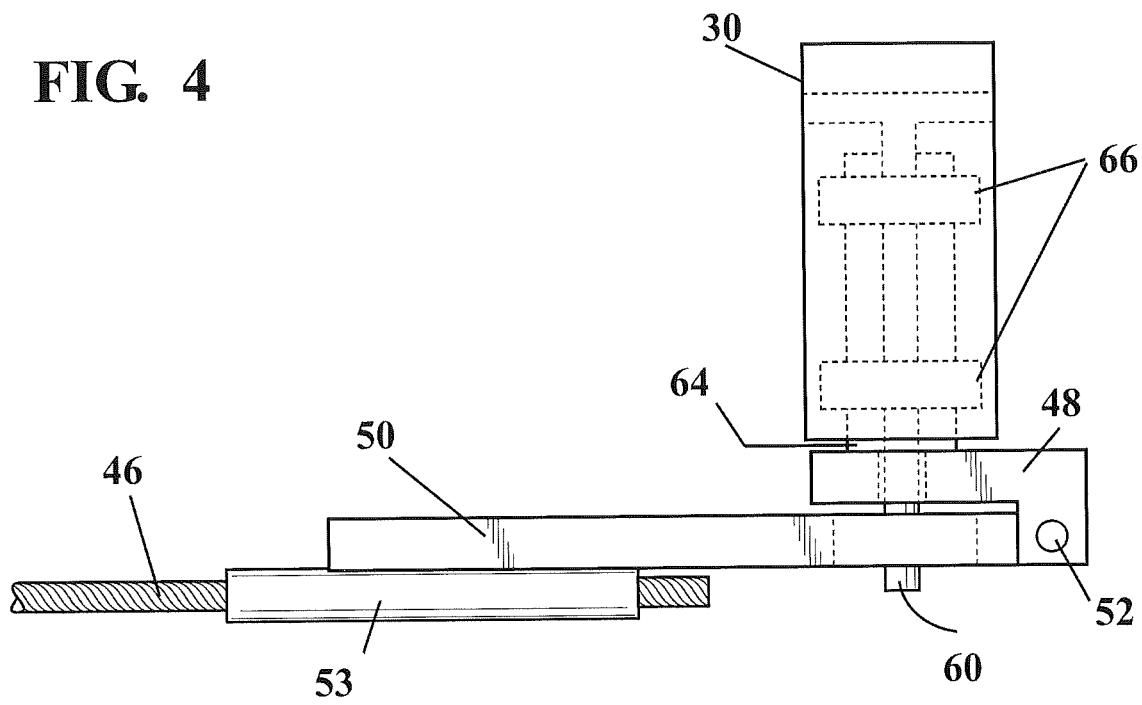
FIG. 4 is a top view of the cable coupler assembly.
Figure 5:
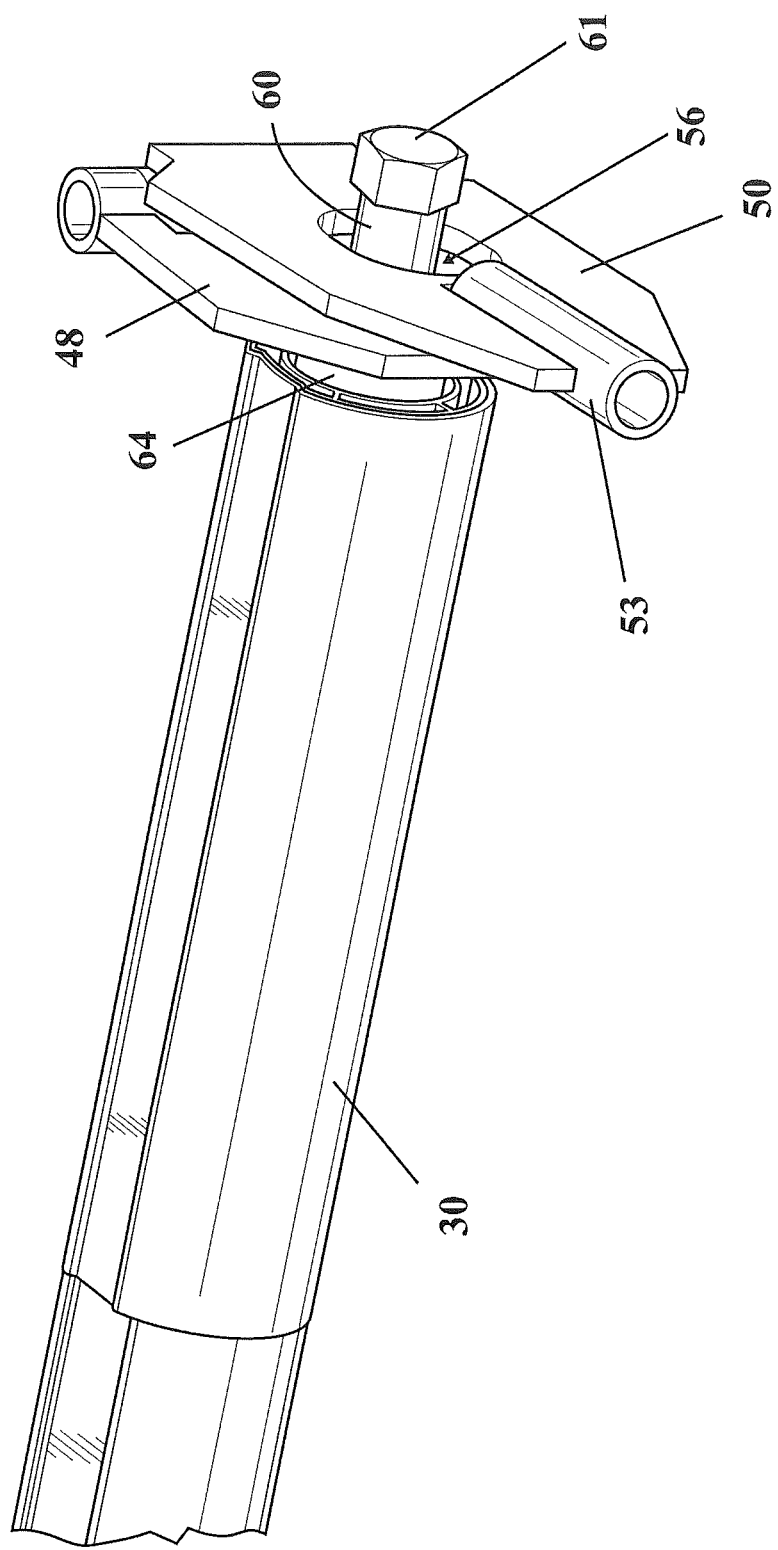
FIG. 5 is a side perspective view of a portion of the cable coupler assembly and a portion of an axle assembly.

Referring to FIGS. 3-5, the cable coupler assembly 44 includes a first hinge member and a second hinge member. In this embodiment, the first hinge member is a hinge inner plate 48 rotatably coupled to and supporting a distal end of the axle assembly 30. The second hinge member is a hinge outer plate 50 pivotally connected to the hinge inner plate 48 by a hinge pin 52. The second end of the flexible cable 46 is crimped, or otherwise fixedly secured, to the hinge outer plate 50. In one embodiment, the second end of the flexible cable 46 is secured in a sleeve 53 which is attached to the hinge outer plate 50. The sleeve 53 may be welded to the hinge outer plate 50 or formed as part of the hinge outer plate 50. In one embodiment, as shown in FIG. 5, the sleeve 53 is set in the hinge outer plate 50. As shown, the connection between the hinge inner plate and hinge outer plate may be a barrel hinge arrangement but other suitable hinge arrangements may be used to permit the degree of rotation of the rear door 20 as described above, such as a flush hinge, pivot hinge, or spring hinge.

In one embodiment, in order to provide access to a manual drive for the axle assembly 30, the hinge inner and outer plates 48, 50 define respective first and second apertures, with the second aperture 56 shown in FIGS. 3 and 5. A distal end of a manual drive shaft 60 for manually rotating the axle assembly 30 thus may extend through the first and second apertures to allow manual winding and unwinding of the tarp 22 about the axle assembly 30 in the occurrence of power failure of the winding assembly 24. In one embodiment, the distal end of the manual drive shaft 60 is terminated by a hex drive nut 61.

As shown in FIGS. 1-4, the hinge pin 52 may be arranged in a vertical direction along axis 62 connecting the hinge inner plate 48 and hinge outer plate 50 for pivotal movement of the hinge outer plate 50 horizontally about the hinge pin 52 approximately 270 degrees. Therefore, when the rear door 20 is pivotally connected to the side wall 16 of the container 12, the hinge outer plate 50 pivots about the hinge pin 52, and passes over the distal end of the manual drive shaft 60, to allow the rear door 20 to pivot approximately 270 degrees between the closed and opened positions without binding, twisting, or torqueing the cable 46 between the arm portion 40 and the cable coupler assembly 44.

Alternatively, the hinge pin 52 may be arranged in a horizontal direction connecting the hinge inner plate 48 and hinge outer plate for pivotal movement of the hinge outer plate vertically about the hinge pin approximately 90 to 180 degrees. Therefore, when the rear door 20 is pivotally connected to the top corners between the side walls 14, 16 of the container 12, the hinge outer plate 50 pivots about the hinge pin 52, and passes over the distal end of the manual drive shaft 60, to allow the rear door 20 to pivot upwardly approximately 90 to 180 degrees between the closed and opened positions without binding, twisting, or torqueing the cable 46 between the arm portion 40 and the cable coupler assembly 44.

In some embodiments, the cable coupler assembly 44 may be fixed with the hinge pin 52 in a vertical or horizontal orientation. The second end of the flexible cable 46 is coupled to the hinge outer plate 50 in a manner which permits the second end of the flexible cable 46 to rotate as cable coupler assembly 44 moves and the tarp is rolled and unrolled. Specifically, the second end of the flexible cable 46 extends through the sleeve 53 and is terminated with a swaged lock end or collar (not shown). This prevents the flexible cable 46 from being pulled out of the sleeve 53 but permits the flexible cable to rotate at the second end.

As shown in FIG. 4, the cable coupler assembly 44 may be rotatably coupled to the axle assembly 30. In one embodiment, the hinge inner plate 48 is coupled to a hinge shaft 64. The hinge inner plate 48 may be welded to the hinge shaft 64 or the hinge inner plate 48 may be connected to the hinge shaft 64 with mechanical fasteners such as bolts or screws. The hinge shaft 64 is coaxial with the axle assembly 30 and is supported by and rotatably coupled to the axle assembly 30. One or more axle bearings 66 provide a rolling surface for the axle assembly 30 over the hinge shaft 64. The bearings 66 may be ball bearings, roller bearings, axial thrust bearings or journal bearings and configured with retaining rings (not shown). The manual drive shaft 60 passes through the hinge shaft 64 and is coupled to the axle assembly 30 for causing manual rotation of the axle assembly 30 and manual opening or closing of the tarp 22. The rotatable coupling ensures that the cable coupler assembly 44 may rotate independently of the axle assembly 30 as the tarp 22 is unrolled and rolled up to cover and uncover the container 12 and its contents. As well, the rotatable coupling ensures that the cable coupler assembly 44 may be oriented in the correct position for opening of the rear door 20.

Figure 6:
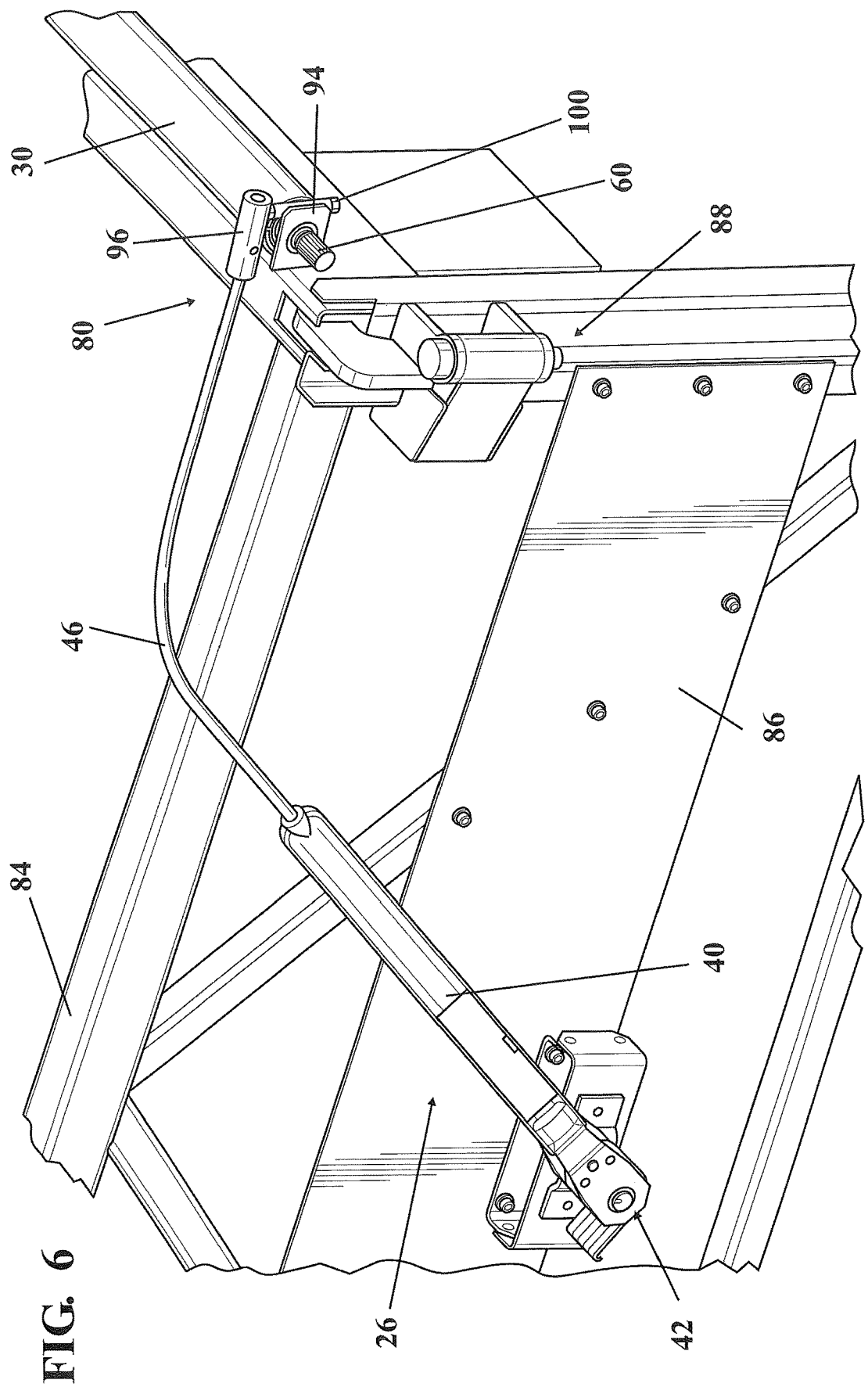
FIG. 6 is a close-up perspective view of a cable coupler assembly according to another embodiment of the present disclosure.
Figure 7:
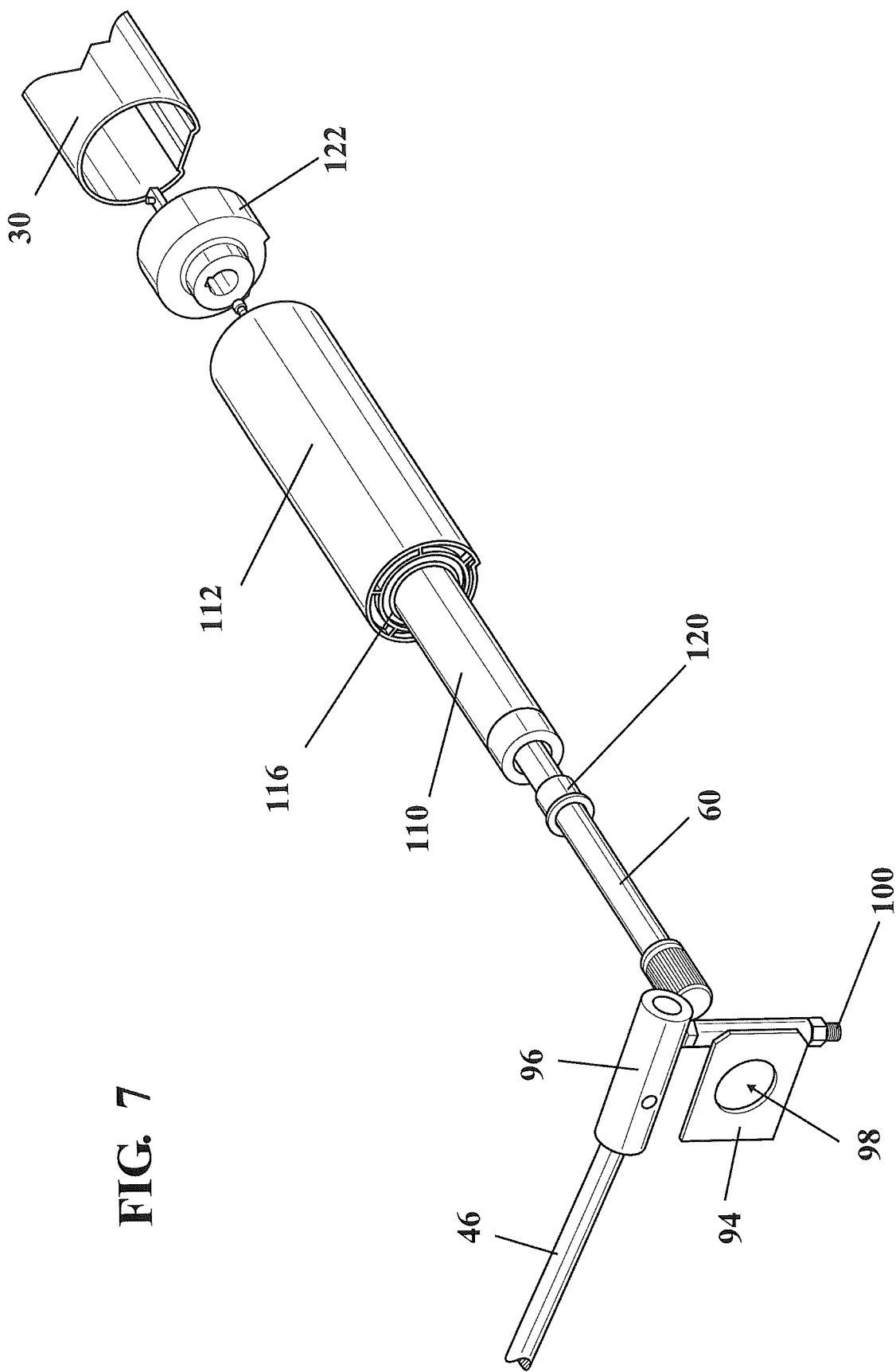
FIG. 7 is an exploded view of the cable coupler assembly of FIG. 6.

FIGS. 6 and 7 illustrate a cable coupler assembly according to another embodiment of the present disclosure. Specifically, FIG. 6 illustrates a cable coupler assembly 80 and a portion of an axle assembly 30 mounted to a test frame 84. The test frame 84 represents the rear portion of a container on a vehicle including a rear panel 86 representing a portion of a rear door 20. The test frame 84 is configured with dual action hinges 88 to simulate a side-opening or an upward opening rear door 20. The tarp and supporting brackets for the tarp and axle assembly are not shown in FIG. 6 but the end of the tarp may be connected to the vehicle container and the tarp and axle assembly may be supported, as is known for roll tarp systems.

In this embodiment, the first hinge member is a hinge inner plate 94 rotatably supporting a distal end of the axle assembly 30. The second hinge member is a cable cap 96 which is coupled to the second end of the flexible cable 46. The second end of the flexible cable 46 may be fixed to the cable cap 96 with any suitable mechanical connection such as, but not limited to, a crimped connection or a set screw. In one embodiment, the second end of the flexible cable 46 may have a swaged lock end or collar (not shown) to retain the flexible cable 46 but permit some rotation of the second end of the flexible cable 46 within the cable cap 96. The cable cap 96 may be a hollow cylindrical shape, as shown, or any suitably shaped cap or cover. In one embodiment, the hinge inner plate 94 defines an aperture 98 to allow the manual drive shaft 60 to pass through the hinge inner plate. The distal end of the manual drive shaft 60 may be terminated in a grip to facilitate manual rotation of the drive shaft 60 and axle assembly 30.

The cable cap 96 is coupled to the hinge inner plate 94 through a hinge pin 100. In one embodiment, the cable cap 96 and hinge pin 100 are welded together. Alternatively, the cable cap 96 and hinge pin 100 may be forged as one piece or the hinge pin 100 may be press fit into the cable cap 96. Specifically, in one embodiment, the cable cap 96 is mounted generally at a right angle to one end of the hinge pin 100 such that cable cap 96 pivots relative to the hinge inner plate 94 with the rotation of the hinge pin 100. The cable cap 96 is mounted to the hinge pin 100 adjacent to one edge of the hinge inner plate 94. The cable cap 96 may be mounted to either end of the hinge pin 100 and the preferred configuration will depend on the direction in which the rear door 20 opens and whether the winding assembly and tarp 22 are mounted adjacent the left or right side wall 14, 16. For example, FIG. 6 represents a configuration with the rolled up tarp being stored on the right or passenger side of the vehicle. For a tarp being stored on the left or driver's side, the cable coupler assembly 80 may be configured to the left of the vehicle, in a mirror image to the configuration shown in FIG. 6. The cable cap 96 is generally rigid or semi-rigid in order to support the flexible cable 46. In one embodiment, the length of the cable cap 96 is generally the same as or greater than the length of the adjacent side of the hinge inner plate 94 to ensure that the flexible cable 46 does not interfere with the axle assembly 30 or manual drive shaft 60. As described above, the hinge pin 100 may be arranged in a vertical or horizontal direction for a respective side-opening or upward opening rear door 20.

FIG. 7 is an exploded view of the cable coupler assembly 80. In this embodiment, the cable coupler assembly 80 includes a hinge shaft 110 and a hinge shaft housing 112. The hinge inner plate 94 may be mounted over and supported by the hinge shaft 110. In one embodiment, the hinge inner plate 94 with aperture 98 is mounted over and welded to the end of the hinge shaft 110 such that the outer face of the hinge shaft 110 is generally flush with the outer surface of the plate 94. The hinge shaft 110 is rotatably coupled to the axle assembly 30 through the hinge shaft housing 112. Specifically, a hinge shaft bearing 116 may be provided at each end of the hinge shaft 110 to rotatably support the hinge shaft 110 within the hinge shaft housing 112, and thus within the axle assembly 30. The hinge shaft bearings 116 may be ball bearings, roller bearings, axial thrust bearings, or journal bearings and configured with retaining rings (not shown). The hinge shaft housing 112 is mounted within and to the axle assembly 30 by any type of a mechanical clamp fastener including screws, pins, rivets or bolts. The hinge shaft 110 and hinge shaft housing 112 are thus mounted internally within the hollow of the axle assembly 30 and substantially concealed from the tarp 22 and external elements.

In one embodiment, the cable coupler assembly 80 and the hinge shaft 110 are configured to support the manual drive shaft 60. Specifically, the hinge shaft 110 is hollow and permits the drive shaft 60 to pass through the hinge shaft to be coupled to the axle assembly 30. The manual drive shaft 60 is rotatably supported within the hinge shaft 110 with one or more drive shaft bearings 120. In one embodiment, the manual drive shaft 60 is coupled to the axle assembly 30 with a manual drive hub 122. The manual drive shaft 60 may be connected to the manual drive hub 122 with a drive key connection, as shown. Alternatively, the manual drive shaft 60 may be splined, welded, press fit or attached to the manual drive hub 122 with a mechanical fastener. In some embodiments, the manual drive shaft 60 and manual drive hub 122 may be formed as one piece. The manual drive hub 122 may be configured with an outer shape complementing and fitting into the inner circumference of the axle assembly 30 in order to effectively transfer drive torque from the manual drive shaft 60 to the axle assembly 30. The manual drive hub 122 may be connected to the axle assembly 30 with mechanical fasteners including screws, pins, rivets or bolts The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A roll tarp system for a truck or trailer having a container with a rear door, the roll tarp system comprising:
   an axle assembly;
   a roll tarp mounted on the axle assembly, attached to one side of the container, and adapted to cover the contents of the container;
   a rear arm pivotally attached to the rear door;
   a cable coupler assembly rotatably coupled to the axle assembly and having first and second hinge members;
   a flexible cable with a first end attached to the rear arm and a second end attached to the second hinge member of the cable coupler assembly;
   wherein the first hinge member comprises a first hinge plate rotatably coupled to the axle assembly and wherein the second hinge member comprises a second hinge plate pivotally coupled to the first hinge plate;
   wherein the first hinge plate defines a first aperture, and wherein the roll tarp system further comprises a manual drive shaft coupled to the axle assembly and extending through the first aperture.

2. The roll tarp system according to claim 1 wherein the first hinge and second plates are pivotally coupled in a barrel hinge, flush hinge, pivot hinge, or spring hinge arrangement.

3. The roll tarp system according to claim 1 wherein the first and second hinge plates define first and second apertures and wherein the manual drive shaft coupled to the axle assembly extends through first and second apertures.

4. The roll tarp system according to claim 1 wherein the first and second hinge members are connected by a hinge pin.

5. The roll tarp system according to claim 4 wherein the hinge pin is oriented vertically for a side-opening rear door or horizontally for an upward opening rear door.

6. The roll tarp system according to claim 1 wherein the second hinge plate comprises a cable cap pivotally coupled to the first hinge plate.

7. The roll tarp system according to claim 6 wherein the cable cap is pivotally coupled to the first hinge plate through a hinge pin.

8. The roll tarp system according to claim 7 wherein the cable cap is connected to one end of the hinge pin.

9. The roll tarp system according to claim 7 wherein the hinge pin is oriented vertically for a side-opening rear door or oriented horizontally for an upward opening rear door.

10. The roll tarp system according to claim 6 wherein the cable coupler assembly further comprises:
   a hinge shaft, the first hinge member being mounted to the hinge shaft,
   a hinge shaft housing coupled to the axle assembly, and
   at least two bearings rotatably coupling the hinge shaft and the hinge shaft housing.

11. The roll tarp system according to claim 10 wherein the cable coupler assembly further comprises a manual drive hub mounted within the axle assembly and wherein the manual drive shaft extends through the hinge shaft and is coupled to the manual drive hub.

12. The roll tarp system according to claim 1 wherein the flexible cable is attached to a distal end of the rear arm, and wherein a proximal end of the rear arm is pivotally attached to the rear door.

* * * * *